(12) United States Patent
Warren et al.

(10) Patent No.: US 6,304,300 B1
(45) Date of Patent: Oct. 16, 2001

(54) FLOATING POINT GAMMA CORRECTION METHOD AND SYSTEM

(75) Inventors: David S. Warren, Mountain View; Andrew D. Bowen, San Jose; David L. Dignam, Belmont, all of CA (US)

(73) Assignee: Silicon Graphics, Inc., Mountain View, CA (US)

(*) Notice: Subject to any disclaimer, the term of this patent is extended or adjusted under 35 U.S.C. 154(b) by 0 days.

(21) Appl. No.: 09/191,456

(22) Filed: Nov. 12, 1998

(51) Int. Cl.[7] ........................................ H04N 5/202
(52) U.S. Cl. ..................... 348/674; 348/677; 348/254; 358/519
(58) Field of Search ................. 348/674, 676, 348/677, 254, 255; 358/519, 164; H04N 5/202

(56) References Cited

U.S. PATENT DOCUMENTS

| | | | |
|---|---|---|---|
| 5,282,036 | * 1/1994 | Worley, Jr. et al. | 358/164 |
| 5,473,372 | * 12/1995 | Nobuoka et al. | 348/254 |
| 5,473,373 | * 12/1995 | Hwung et al. | 348/254 |
| 5,818,521 | * 10/1998 | Hieda | 348/254 |
| 5,910,796 | * 6/1999 | Gormish | 348/674 |
| 6,020,921 | * 2/2000 | Aleksic et al. | 348/254 |

\* cited by examiner

Primary Examiner—Reinhard J. Eisenzopf
Assistant Examiner—Trang U. Tran
(74) Attorney, Agent, or Firm—Martine & Penilla, LLP

(57) ABSTRACT

The present invention provides a method, a device, and a system for performing gamma correction on a set of pixel data based on a gamma correction curve table. The gamma correction curve table includes a specified total number of intensity levels associated with gamma corrected pixel values with one intensity level per pixel value. The method includes partitioning the gamma correction curve table into N segments such that each of the N segments is associated with a set of intensity levels from the specified total number of intensity levels. A plurality of intensity levels is selected for each of the N segments such that significant banding effects are not visible to the human eye between an adjacent pair of the selected intensity levels. The gamma corrected pixel values are stored for each of the N segments such that each of the plurality of selected intensity levels functions as an index to the associated gamma corrected pixel values. Gamma correction is performed on the set of pixel data by accessing a stored pixel value in one of the N segments in response to the pixel data to generate gamma corrected pixel data.

25 Claims, 11 Drawing Sheets

FLOATING POINT GAMMA CORRECTION METHOD AND SYSTEM

BACKGROUND OF THE INVENTION

The present invention relates to display systems and, more particularly, to gamma correction to compensate for the non-linear characteristics of display devices.

Rendering of realistic images (e.g., two- or three-dimensional images) on a display device such as a display monitor has been a primary goal of graphics system designers. Rendering images of real or imaginary objects typically involves generating perspective projections of the objects and applying lighting effects to the visible surfaces. For example, conventional techniques typically apply various lighting or illumination models and surface rendering algorithms (e.g., Phong lighting, Gouraud shading, etc.) to determine the intensity values of individual pixels that comprise an image for display.

Among other requirements, rendering of realistic images requires an accurate modeling of colors and lighting effects including light reflections, transparency, surface texture, shadows, etc. In general, the illumination models generate a linear range of intensities (e.g., 0 to 1.0). For instance, an RGB color (0.25, 0.25, 0.25) represents one-half the intensity of RGB color (0.5, 0.5, 0.5) and one-third the intensity of RGB color (0.75, 0.75, 0.75). These RGB values are usually stored as linear values with one or more bits for each of the three R, G, and B components. In this linear arrangement, a pixel with the value of (64, 64, 64), for example, has twice the intensity of a pixel with the value (32, 32, 32).

Display devices, however, typically exhibit non-linear characteristics that hinder display of linear intensities. For example, FIG. 1A shows a typical response curve 102 of an exemplary display device. The response curve 102 plots normalized intensity displayed on the display device as a function of normalized electron gun voltage of the display device. The response curve of the display device shows that the displayed intensity and the electron gun voltage are non-linear. Such non-linear characteristics generally lead to inaccurate or unrealistic images.

A response curve can generally be described in the form of the equation $I=\alpha V^\gamma$, where I is the displayed intensity, V is the input voltage to a display device, and $\alpha$ and $\gamma$ depend on the characteristics of a display device. The non-linearity of display devices is typically characterized by an exponential value $\gamma$ of between 2.0 and 3.0.

To correct the non-linearity associated with $\gamma$, a technique commonly known as "gamma correction" has been widely used to compensate for the non-linear characteristics of display devices. Gamma correction essentially involves determining a compensating correction curve to allow linear input-output characteristics. An input voltage required to produce a desired intensity is determined in accordance with the equation $V=(I/\gamma)^{1/\gamma}$.

FIG. 1B shows an exemplary gamma correction curve 104 for mapping pixel intensities to input voltages of a display device. In display systems, the gamma correction curve 104 may be implemented as a lookup table, which samples and stores pixel intensities and associated input voltages. The pixel intensities produced are used as indices to select the associated input voltages stored in the lookup table. The input voltages are then fed to the display device for generating images. The gamma correction table is thus used to compensate for the non-linear characteristics of the display device.

Conventional gamma correction methods typically store the gamma table in a RAM unit for performing gamma correction. Unfortunately, these techniques often do not provide adequate gamma correction in a low luminance range typically associated with low light conditions (e.g., a night scene). As shown in FIG. 1B, the portion of gamma correction curve 104 in low luminance region 106 is significantly steeper than portion of curve 104 in higher luminance region 108. Hence, the intensity difference between two adjacent samples in the low luminance region 106 of gamma correction curve 104 is significantly greater than for two adjacent samples in the higher luminance region 108 of curve 104.

As a solution, some conventional display systems have implemented higher resolutions and intensity levels in all luminance regions by employing a larger RAM to store a gamma correction table and a wider datapath to access the RAM. For example, a conventional computer graphics system uses a 64 K×36 bit RAM to store 64K intensity levels as gamma table entries. This system uses a full 16-bit datapath to access the entries stored in the RAM. It has been empirically determined that human eyes cannot distinguish between two intensities when the difference therebetween is less than or equal to about 1%. The use of 64 K intensity levels along with the 16-bit datapath ensures that the intensity change between two consecutive intensity levels is less than or equal to about 1% throughout the 64 K intensity levels.

Implementing a full 16-bit datapath with a 64 K RAM, however, is costly to implement in all but the most expensive computer graphics systems. For example, such a system is costly since it requires a large lookup table with attendant cost of moving 16-bit data per component. Such large datapath and RAM require a large die area in an integrated circuit chip or fast external memory. Furthermore, such design requires complex and expensive supporting circuitry.

Another conventional approach has generated a gamma correction curve of 4 K (i.e., 4,096) intensity levels and uses 1 K (i.e., 1024) entries from the 4 K intensity levels to perform gamma correction. This technique uses a 12-bit datapath to receive 12-bit input data. The gamma correction curve is partitioned into three segments. Specifically, the first 512 intensity levels from the low luminance region are stored at full 12-bit resolution in a 512×12 bit RAM. Of the next 512 entries from the intermediate luminance region, 256 entries (i.e., 50%) are selected and stored at 8-bit resolution in a 256×8 bit RAM. Finally, of the remaining 3072 entries, 768 entries (i.e., 25%) are selected and stored at 8-bit resolution in a 768×8 bit RAM. The three most significant bits in the 12-bit input data are used to select from which RAM to look up an appropriate entry in the RAM.

While this technique provides improved RAM space utilization, it does not improve low luminance gamma correction as it does not provide a sufficient number of intensity levels to eliminate significant banding effects across the entire gamma curve.

Thus, what is needed is a technique for providing gamma correction in all regions of a gamma correction curve including the low luminance range without employing expensive and complex hardware and supporting circuitry. In addition, what is needed is a gamma correction technique that provides sufficient resolution in all regions of the gamma correction curve so that significant banding effects are substantially eliminated.

SUMMARY OF THE INVENTION

The present invention fills these needs by providing a method, a device, and a system that efficiently performs gamma correction in all regions of a gamma correction curve without exhibiting significant banding effects. It should be appreciated that the present invention can be implemented in numerous ways, including as a process, an apparatus, a system, a device, a method, or a computer readable medium.

In one aspect of the invention, a method for performing gamma correction on a set of pixel data, based on a gamma correction curve table, is provided. The gamma correction curve table includes a specified total number of intensity levels associated with gamma corrected pixel values, with one intensity level per pixel value. The method includes partitioning the gamma correction curve table into N segments such that each of the N segments is associated with a set of intensity levels from the specified total number of intensity levels. A plurality of intensity levels is selected for each of the N segments. The intensity levels are preferably selected such that significant banding effects are not visible to the human eye between an adjacent pair of selected intensity levels. The gamma corrected pixel values are stored for each of the N segments such that each of the plurality of selected intensity levels functions as an index to the associated gamma corrected pixel values. Gamma correction is performed on the set of pixel data by accessing a stored pixel value in one of the N segments, in response to the pixel data, to generate gamma corrected pixel data.

In another aspect of the invention, a device for performing gamma correction on a set of pixel data, based on a gamma correction curve table, is provided. The gamma correction curve table includes a specified total number of intensity levels associated with gamma corrected pixel values, with one intensity level per pixel value. The device includes means for partitioning the gamma correction curve table into N segments such that each of the N segments is associated with a set of intensity levels from the specified total number of intensity levels. The device also includes means for selecting a plurality of intensity levels for each of the N segments. The intensity levels are preferably selected such that significant banding effects are not visible to the human eye between an adjacent pair of selected intensity levels. The device further includes means for storing the gamma corrected pixel values for each of the N segments such that each of the plurality of selected intensity levels functions as an index to the associated gamma corrected pixel values. In addition, the device includes means for performing gamma correction on the set of pixel data by accessing a stored pixel value in one of the N segments, in response to the pixel data, to generate gamma corrected pixel data.

In a further aspect of the invention, a display system for performing gamma correction on a set of pixel data, based on a gamma correction curve table, is provided. The gamma correction curve table includes a specified total number of intensity levels associated with gamma corrected pixel values with one intensity level per pixel value. The display system includes a bus, a processor, a main memory, a mass storage unit, a graphics unit, and a display device. The processor, main memory, mass storage unit, and graphics unit are coupled to the bus.

The graphics unit includes a gamma correction unit, which includes N storage units for storing the gamma corrected pixel values associated with selected intensity levels from N segments of the gamma correction curve table. The selected intensity levels in each of the N segments are preferably chosen such that significant banding effects are not visible to the human eye between an adjacent pair of selected intensity levels. Each of the selected intensity levels functions as an index to the associated gamma corrected pixel values, wherein the set of pixel data is used as an index to access a stored gamma corrected pixel value in one of the N segments. The display device is coupled to receive and display the gamma corrected pixel value. In an alternative embodiment, the display device is coupled to the bus.

The present invention advantageously provides efficient gamma correction in all regions of a gamma correction curve by allowing partitioning of the gamma correction curve into a plurality of segments. Furthermore, by providing higher intensity resolutions in low luminance regions and lower resolutions in high luminance regions, the present invention enables significant banding effects throughout the entire gamma correction curve to be eliminated. In one embodiment, the present invention uses an actual datapath of $(M+\log_2 N)$ bits to provide a larger effective datapath by storing N segments of the gamma correction curve in N memory units with each memory unit storing up to $2^M$ entries. Accordingly, the method, device, and system of the present invention provide an efficient and economical gamma correction solution without the use of expensive and complex hardware and supporting circuitry. Other aspects and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Figure 1A:
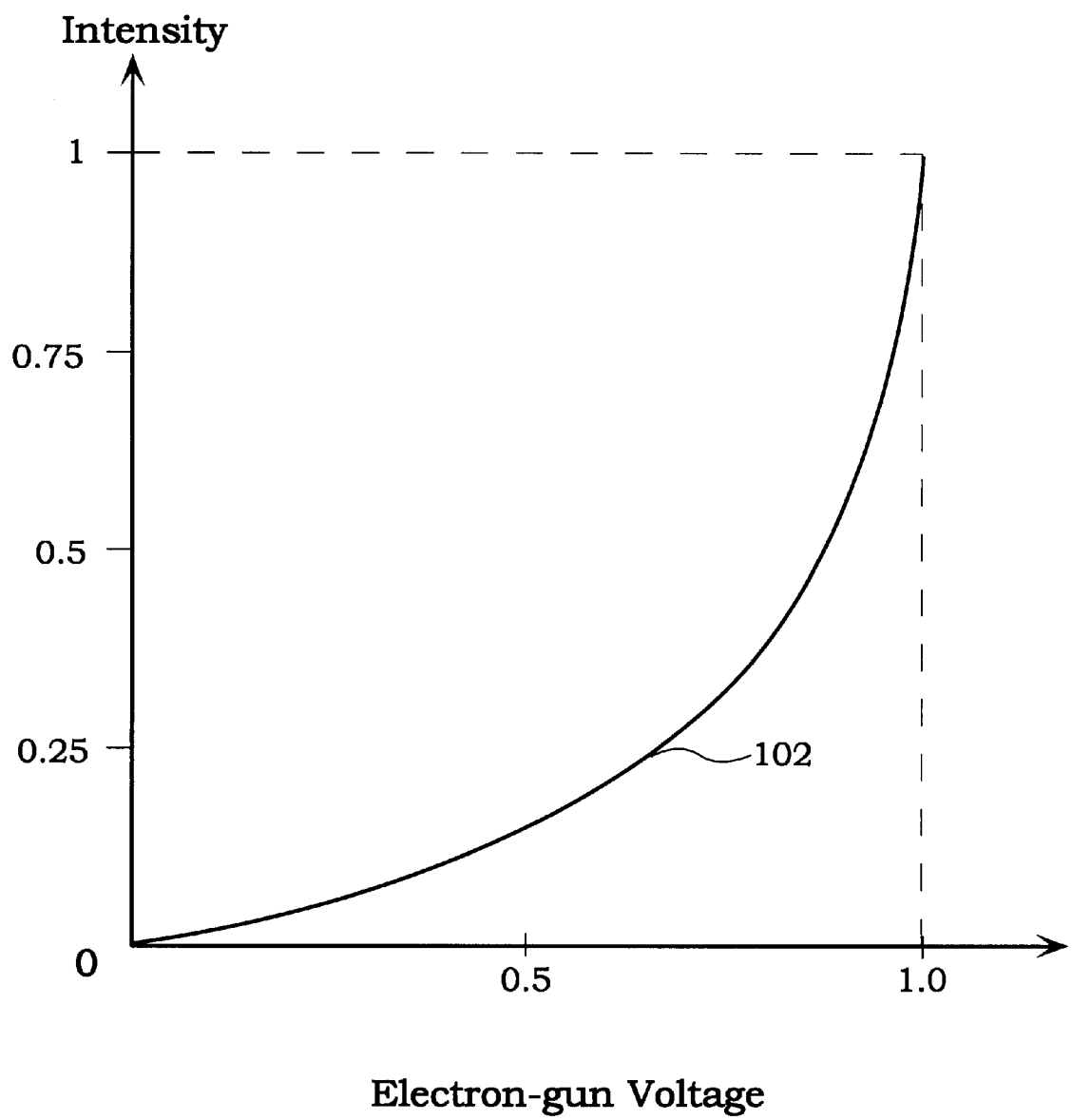
FIG. 1A shows a typical response curve of an exemplary display device.
Figure 1B:
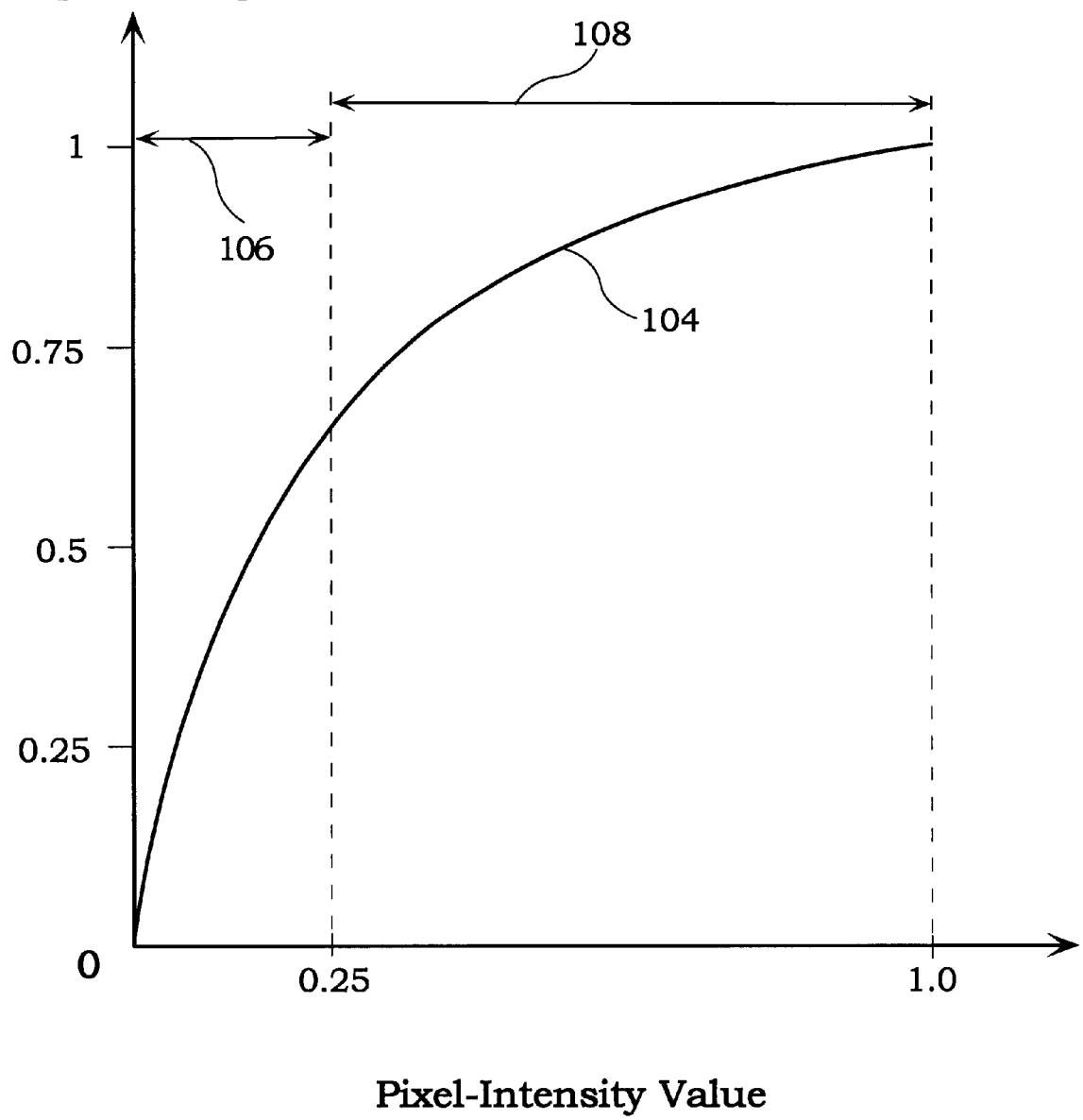
FIG. 1B shows an exemplary gamma correction curve 104 for mapping pixel intensities to input voltages of a display device.

Reference will now be made to the present preferred embodiments of the invention, examples of which are illustrated in the accompanying drawings. FIGS. 1A and 1B are described above in the "Background of the Invention" section.

In the following detailed description of the present invention, which includes a method, a device, and a system for performing gamma correction in all regions of a gamma correction curve, numerous specific details are set forth to provide a thorough understanding of the present invention. It will be obvious to one skilled in the art, however, that the present invention may be practiced without these specific details. In other instances, well known methods, procedures, components, and circuits have not been described in detail so as not to unnecessarily obscure certain aspects of the present invention.

The present invention provides improved gamma correction over the entire range of a gamma correction curve without exhibiting significant banding effects to human eyes. In particular, the present invention provides a higher number of intensity levels in low luminance scenarios, thereby allowing the display of such scenarios with significantly less banding effects. At the same time, the number of intensity levels in higher luminance scenarios is decreased to reduce the complexity and cost associated with additional storage and supporting circuitry requirements. In one embodiment, the present invention stores N segments of a gamma correction curve in N memory units with each memory unit storing up to $2^M$ entries. This scheme enables an effective datapath greater than the actual datapath of $(M+\log_2 N)$ bits, as will described in more detail below.

Figure 2:
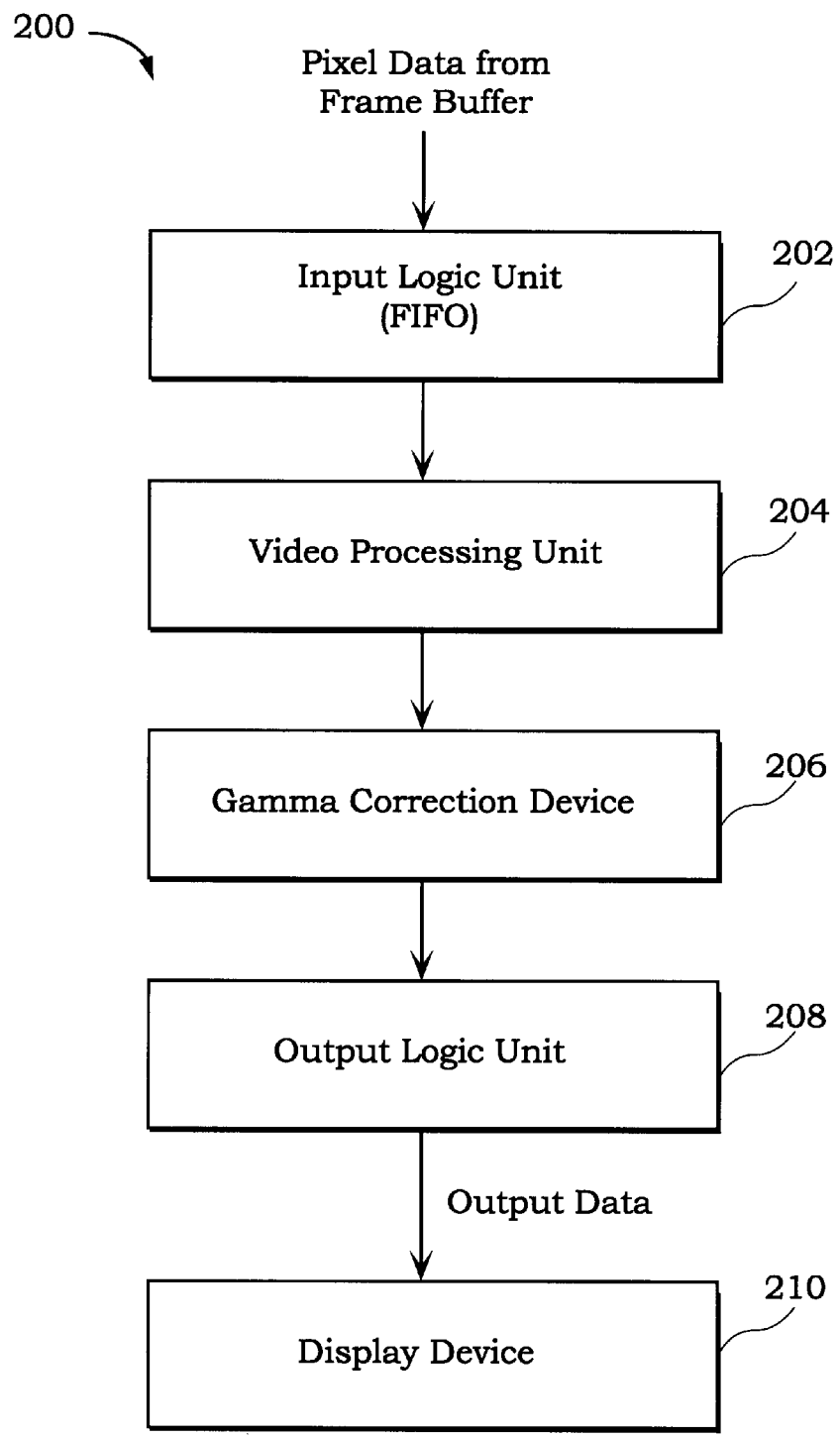
FIG. 2 illustrates a gamma correction apparatus in accordance with one embodiment of the present invention.

FIG. 2 illustrates a gamma correction display system 200 in accordance with one embodiment of the present invention. The gamma correction display system 200 includes an input logic unit 202, a video processing unit 204, a gamma correction device 206, and an output logic unit 208. The input logic unit 202 receives pixel data, for example, from a frame buffer, and provides interface functions such as synchronization and the like. Preferably, the input logic unit is implemented as a FIFO buffer. The video processing unit 204 is coupled to the input logic unit 202 to receive the pixel data for performing various graphics functions such as color mapping, filtering, resizing, etc.

The gamma correction device 206 is coupled to receive the processed pixel data from the video processing unit 204 and performs gamma correction in accordance with the present invention. The gamma correction device 206 then feeds the gamma corrected pixel data into the output logic unit 208, which performs post video processing such as converting the data from digital to analog form and producing time stamps for digital video output. The post video processed pixel data may then be fed to a display device 210 for display. It should be appreciated that the term "display device" used herein includes not only display devices such as monitors, TVs, and flat panel displays, but also any recording and printing devices that exhibit non-linear gamma characteristics.

Figure 3:
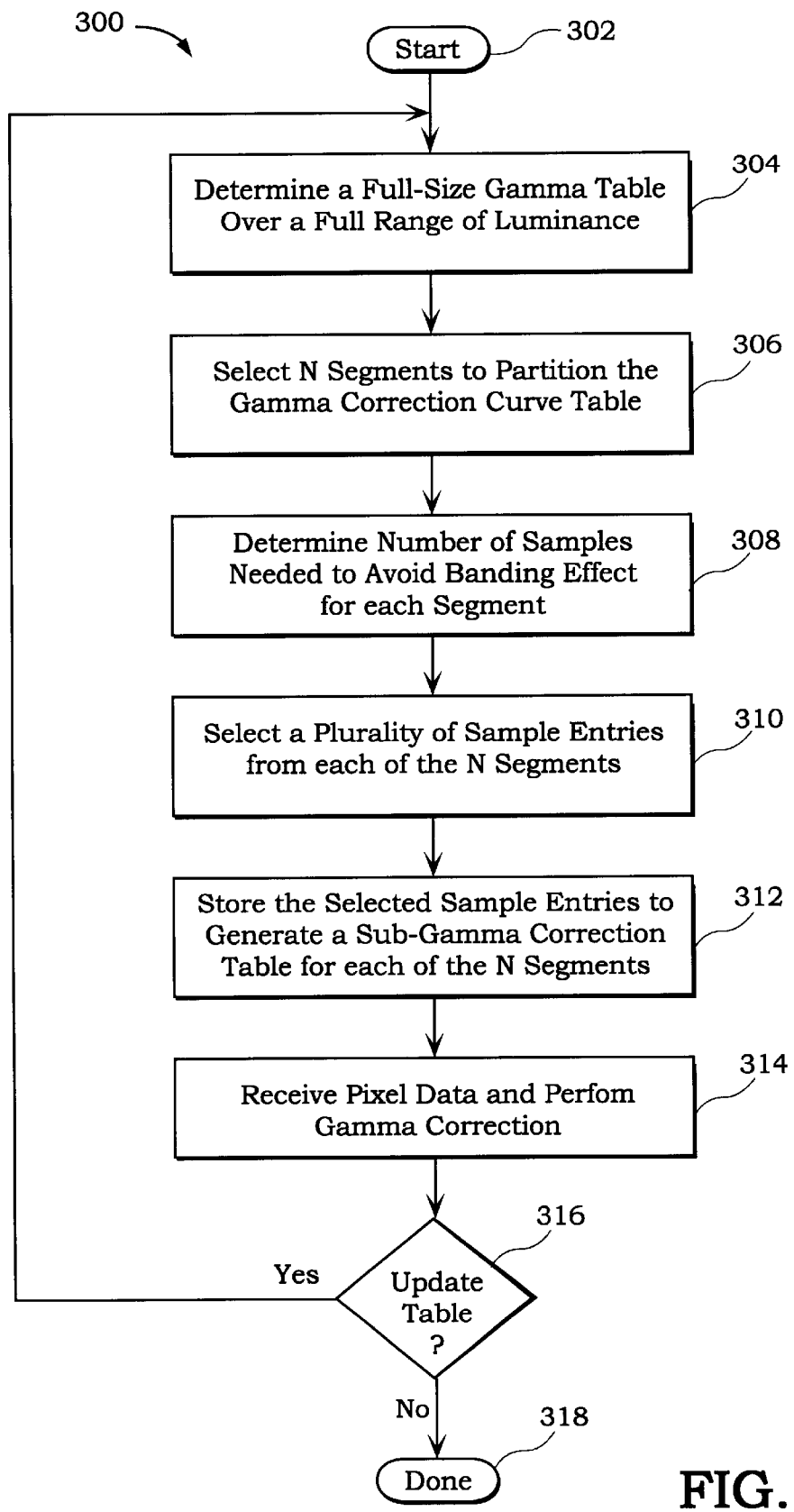
FIG. 3 shows a flowchart of a method implemented in a gamma correction device for performing gamma correction in accordance with one embodiment of the present invention.

FIG. 3 shows a flowchart of a method 300 implemented in the gamma correction device 206 for performing gamma correction in accordance with one embodiment of the present invention. The method 300 starts in operation 302 and proceeds to operation 304, where the gamma correction device 206 determines a total number of intensity levels of a full-size gamma correction curve table over a full range of luminance (e.g., 0 to 1.0). Preferably, the total number of intensity level entries is sufficient to provide an intensity difference of less than or equal to 1% between adjacent intensity levels to eliminate significant banding effects.

In operation 306, the gamma correction device 206 selects a number of segments, N, into which the gamma correction curve table is to be partitioned. The number of segments, N, is an integer greater than or equal to 2 in accordance with one preferred embodiment of the present invention. Then, in operation 308, the gamma correction device 206 determines the number of intensity levels for each of the N partitioned segments such that significant banding effects are eliminated between a pair of adjacent intensity levels in all N segments. In one embodiment, the intensity difference between adjacent intensity levels in each of the N segments is less than or equal to about 1%. Although the use of an intensity change of less than or equal to approximately 1% between two adjacent intensity levels is preferred, it should be recognized that any percentage change that substantially eliminates banding effects as viewed from human eyes may be used to implement the present invention.

The gamma correction device 206 then selects, in operation 310, a plurality of intensity levels for each of the N segments so that the intensity difference between selected adjacent intensity levels is less than or equal to about 1%. In operation 312, the selected number of intensity levels for the N segments are stored in N memory units, one segment per memory unit. Preferably, the selected intensity levels and the associated gamma corrected intensity values are stored in the memory units to implement one or more lookup tables. For example, the gamma corrected intensity values associated with the selected intensity levels are stored in the memory units with the associated intensity levels functioning as addresses to the stored gamma corrected pixel values. The memory units may be implemented as a single memory unit with N partitions or as N separate and distinct memory units. In addition, the memory units may be implemented as RAM, SRAM, DRAM, SDRAM, RDRAM, or any other suitable memory unit for implementing a lookup table.

As will be described in more detail below, the gamma correction device 206 receives pixel data and performs gamma correction on the received pixel data in operation 314. Then, in operation 316, the gamma correction device 206 determines whether to update the gamma correction curve table. If the table is to be updated, then the method 300 proceeds to repeat operation 304. Otherwise, the method 300 proceeds to operation 318, where the method 300 terminates.

Figure 4:
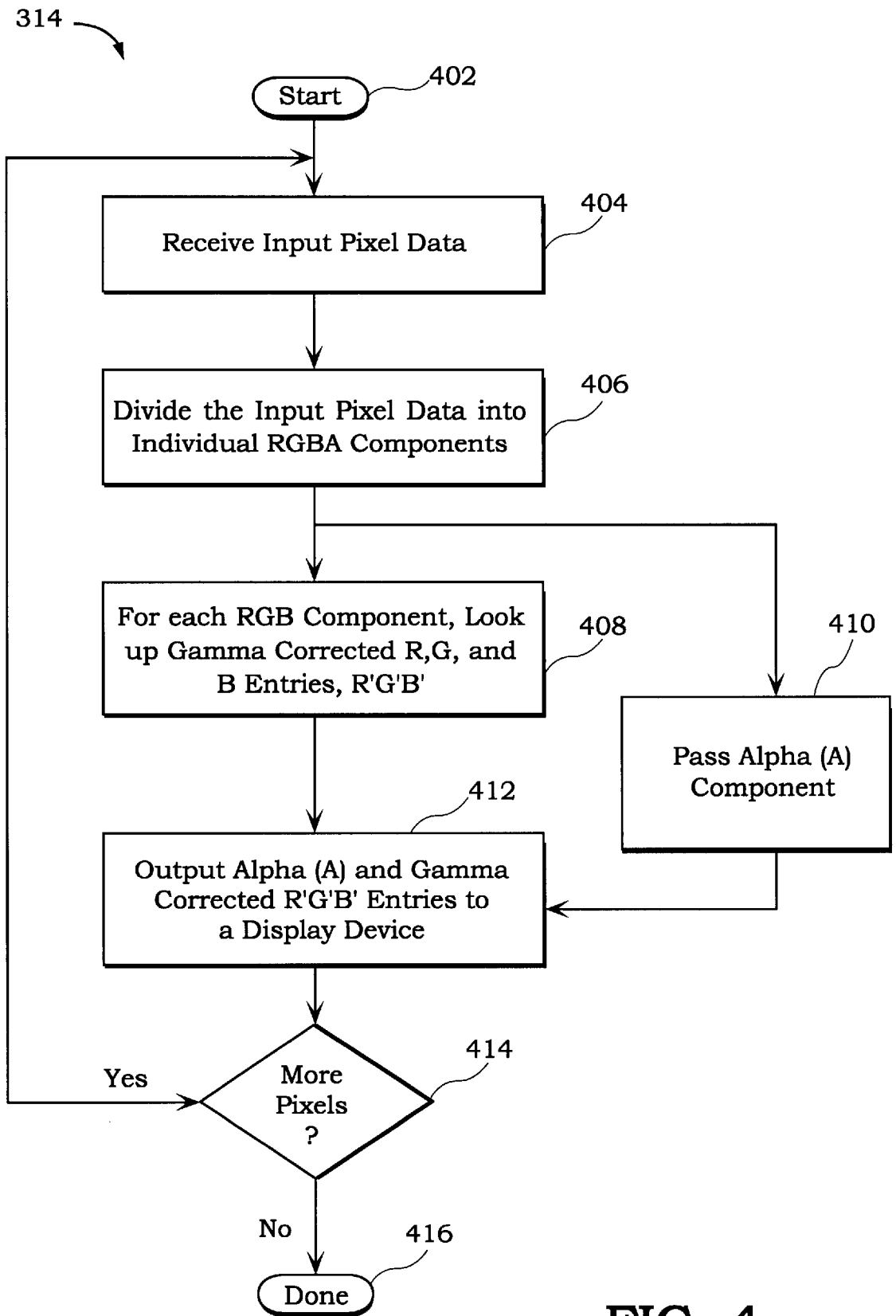
FIG. 4 illustrates a more detailed flowchart of a gamma correction operation in accordance with one embodiment of the present invention.

FIG. 4 illustrates a more detailed flowchart of the gamma correction operation 314 of FIG. 3 in accordance with one embodiment of the present invention. The gamma correction operation 314 starts in operation 402 and proceeds to operation 404, where input pixel data is received for the gamma correction operation. Then, in operation 406, the input pixel data is divided (e.g., split) into individual RGBA (red, green, blue, alpha) components. Each of the R, G, and B components is then used, in operation 408, as indices to look up gamma corrected R, G, and B entries (e.g., R', G', and B' intensity values). A selected number of bits in each of the R, G, and B components is used to select one of the memory units while the remaining bits are used as an index to look up a stored value in the selected memory unit. The lookup process preferably employs a floating point gamma correction scheme. For example, in one embodiment, the floating point gamma correction scheme involves using a 12-bit datapath where 2 bits are used to select one of 4 memory units and the remaining 10 bits are used as indices to the selected memory unit. This scheme provides an effective datapath of 16 bits while substantially eliminating banding effects associated with smaller datapaths.

Simultaneous with operation 408, the alpha component A is passed without gamma correction in operation 410. The gamma corrected R'G'B' components are then transmitted, along with the alpha (A) component, to a display device in operation 412. In operation 414, it is determined whether more pixels exist for gamma correction. If more pixels exist, then the gamma correction operation 314 proceeds back to operation 404 to receive input pixel data. Otherwise, the gamma correction operation 314 terminates in operation 416.

The present invention advantageously makes use of the way human eyes perceive light and color. Specifically, as previously mentioned, a viewer can detect a difference between two intensities if the difference is more than about 1%. For example, human eyes are capable of detecting the difference between two relatively low intensity values, e.g., 2 and 5, because the difference between these values is about 150%. On the other hand, the difference between two relatively high intensity values, e.g., 1002 and 1005, which represents a change of about 0.3%, would not be detectable. Accordingly, one advantage of the present invention is that it provides higher resolution in the low intensity range (e.g., low luminance scenarios).

Figure 5A:
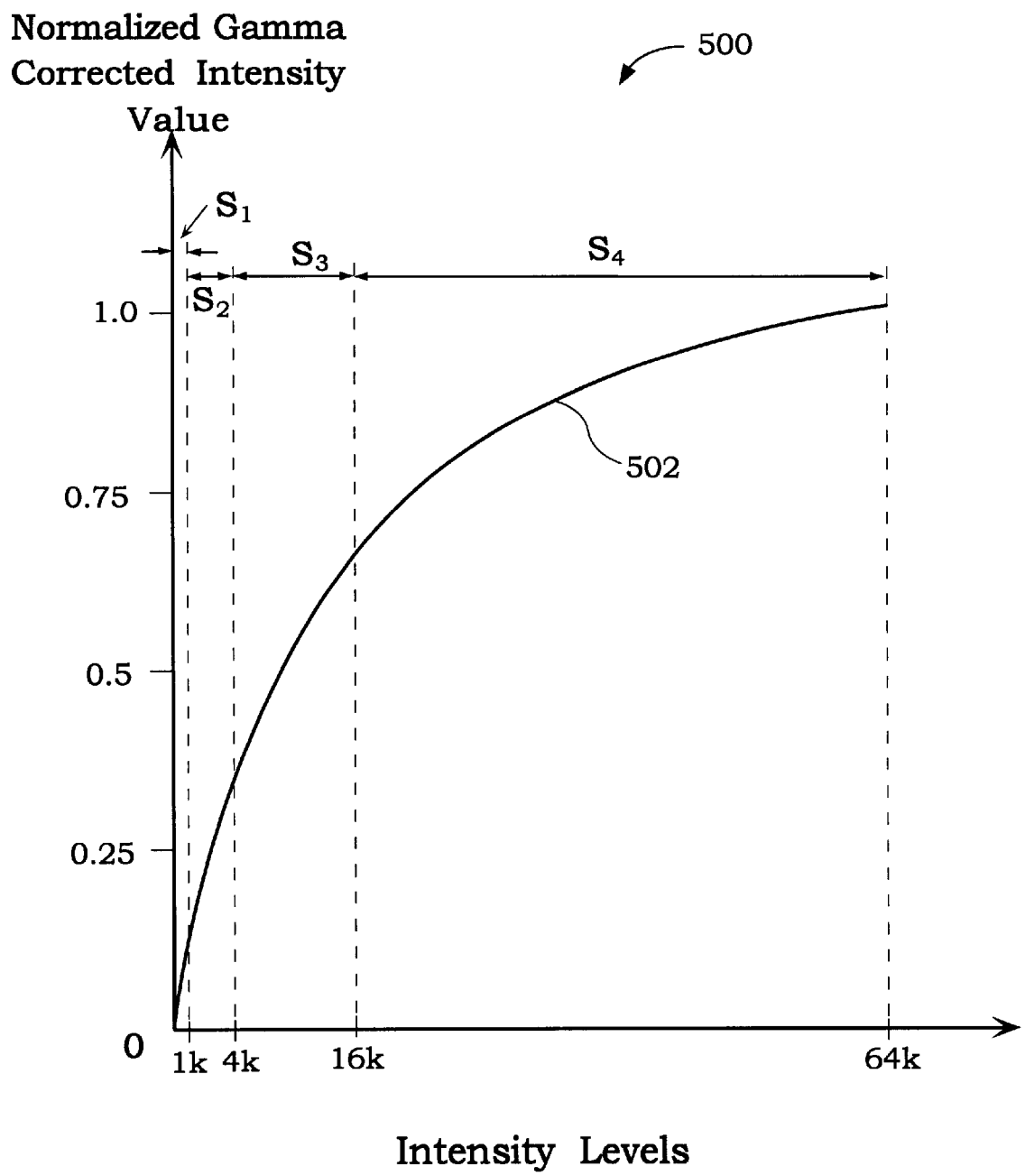
FIG. 5A shows a graph of a gamma correction curve for illustrating partitioning of the curve into $N_s$ segments to provide a higher resolution in a low luminance region of the curve in accordance with one embodiment of the present invention.

FIG. 5A shows a graph 500 of a gamma correction curve 502 for illustrating partitioning of the curve 502 into N segments to provide higher resolution in the low luminance region of curve 502 in accordance with one embodiment of the present invention. The gamma correction curve 500 plots normalized input voltage of a display device (i.e., gamma-corrected pixel data) from 0 to 1.0 as a function of intensity levels ranging from 0 to 64 K (65,535). The gamma correction curve 500 is partitioned into four segments (N=4) and includes segments $S_1$, $S_2$, $S_3$, and $S_4$. Segment $S_1$ includes the first 1,024 luminance levels in the low luminance region and all 1,024 entries from this segment are selected and stored in a memory unit for gamma correction. The segment $S_2$ includes the next 3,072 intensity levels. In this intensity range, 768 intensity levels (e.g., 25%) are selected and stored in a memory unit for performing gamma correction.

From the next 12,288 intensity levels in the segment $S_3$ 768 intensity levels, representing 6.25%, are selected and stored in a memory unit. The segment $S_4$ includes the next 49,152 intensity levels, from which 1.56% or 768 intensity levels are selected and stored in a memory unit. The following Table 1 illustrates the mapping of input data ranges into logically distinct memory units:

TABLE 1

| Input Data Range | RAM Size | Percent Sampled | Number Sampled |
|---|---|---|---|
| 0–1,023 | 1K × 12 | 100 | 1,024 |
| 1,024–4,095 | 768 × 12 | 25 | 768 |
| 4,096–16,383 | 768 × 12 | 6.25 | 768 |
| 16,384–65,535 | 768 × 12 | 1.56 | 768 |

Figure 5B:
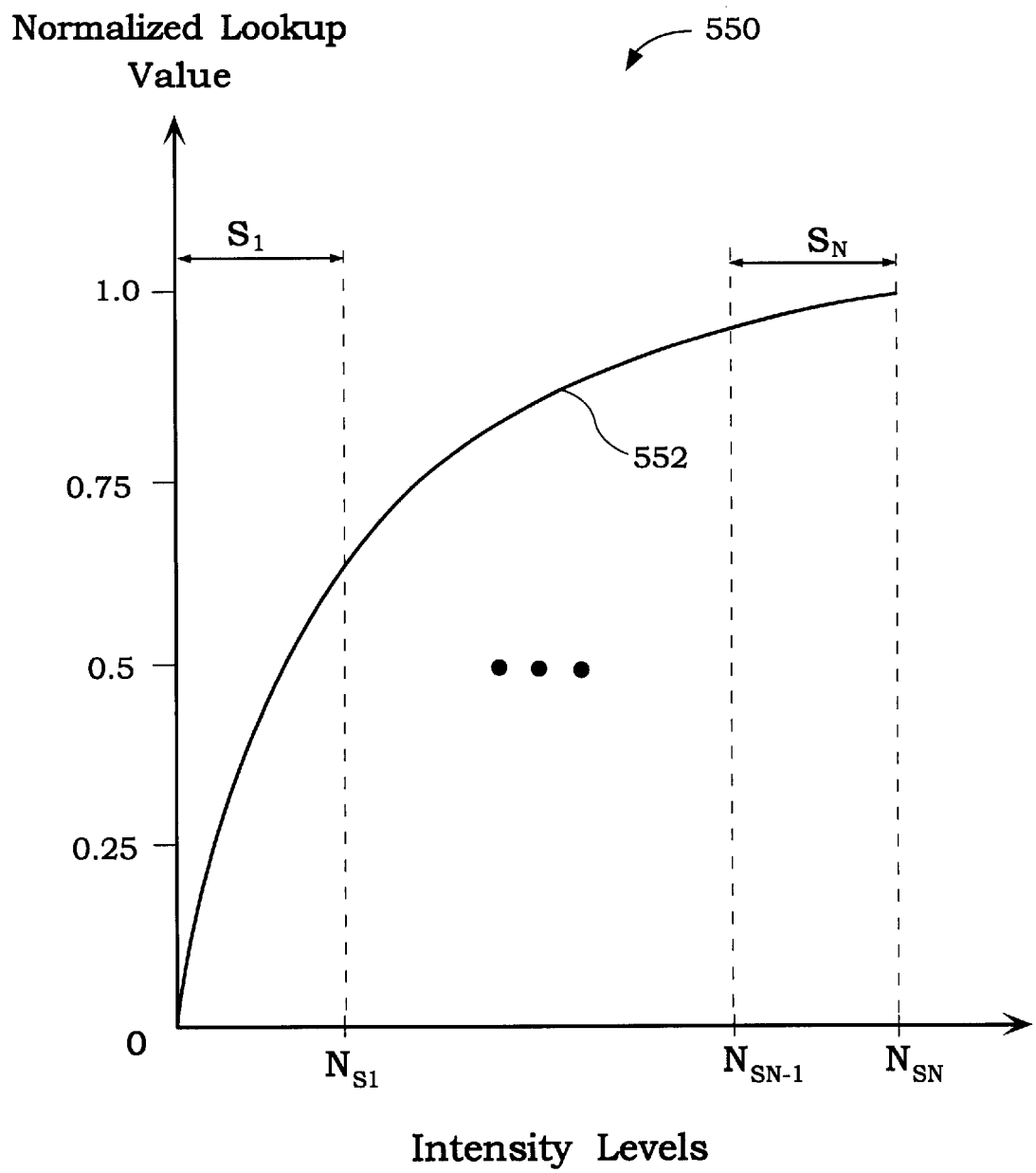
FIG. 5B illustrates a graph of a gamma correction curve for illustrating a generic partitioning scheme in accordance with one embodiment of the present invention.

FIG. 5B illustrates a graph 550 of a gamma correction curve 552 for illustrating a generic partitioning scheme in accordance with one embodiment of the present invention. The gamma correction curve 552 plots normalized look-up value (e.g., electron gun voltage, gamma-corrected value, etc.) as a function of intensity levels from 0 to $N_{SN}$. The gamma correction curve 552 is partitioned into N segments.

In a preferred embodiment, the partition and sampling scheme uses a multiplier K. For example, the (N+1)th segment includes K times as many intensity levels as the Nth segment. Further, the (N+1)th segment samples 1/K times the intensity levels in its segment. Those skilled in the art will appreciate that other partitioning and selection schemes that provide a change of less than or equal to about 1% between adjacent selected intensity levels are also suitable for implementation in the present invention.

Figure 6:
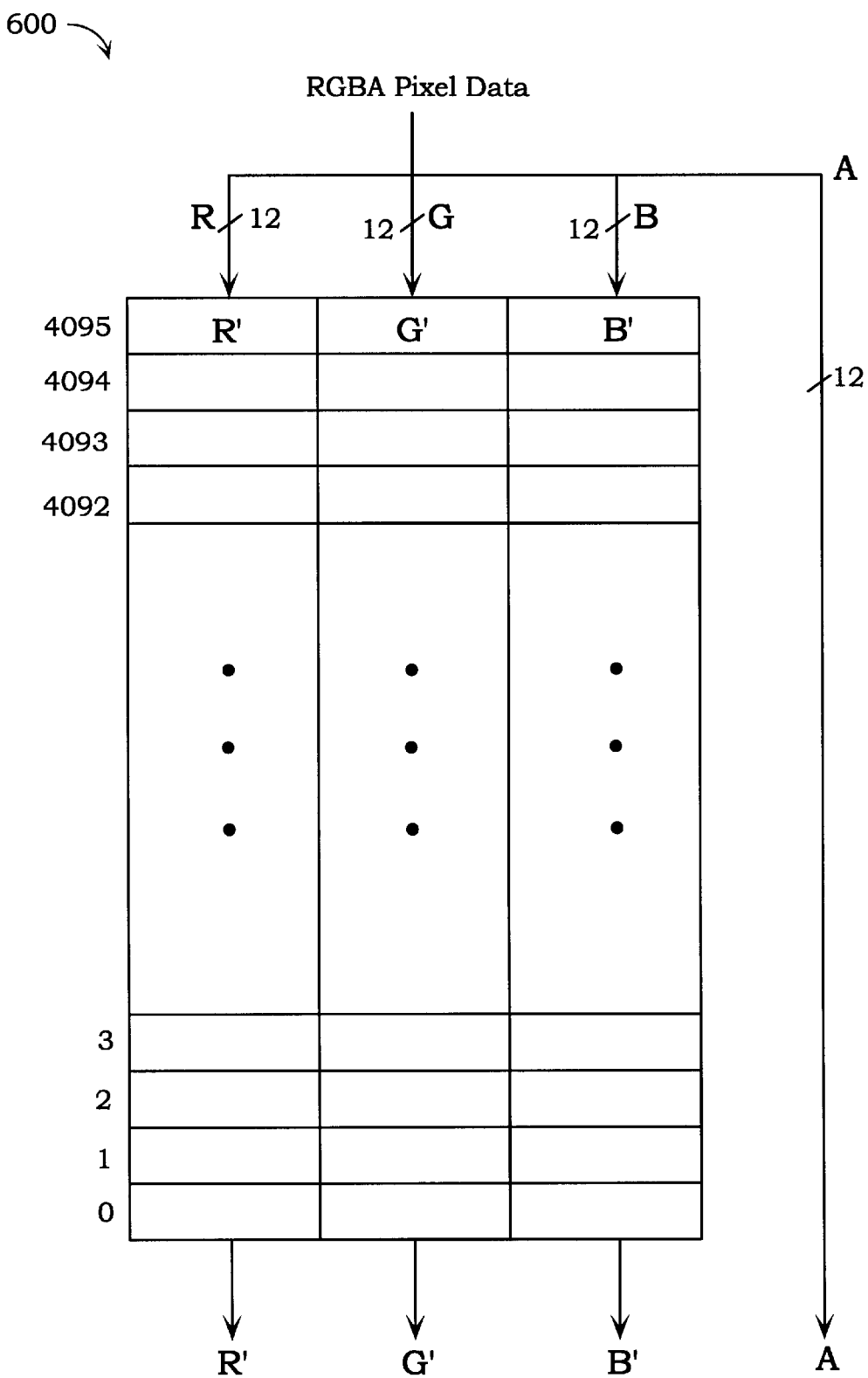
FIG. 6 shows, in accordance with one embodiment, a block diagram of a gamma correction table for looking up a gamma corrected value using RGB component values as indices.

FIG. 6 shows, in accordance with one embodiment, a block diagram of a gamma correction table 600 of size 4 K×12×3 for looking up a gamma corrected value using RGB component values as indices. The gamma correction table 600 receives 12-bit R, G, and B components and uses these values as indices to look up selected gamma corrected R', G', and B' components, respectively. The gamma correction table 600 includes 4 K entries for each color component. In an alternative embodiment, the gamma correction table 600 may include one lookup table of size 4 K×12 bits, which may be used for all three R, G, and B components.

Figure 7:
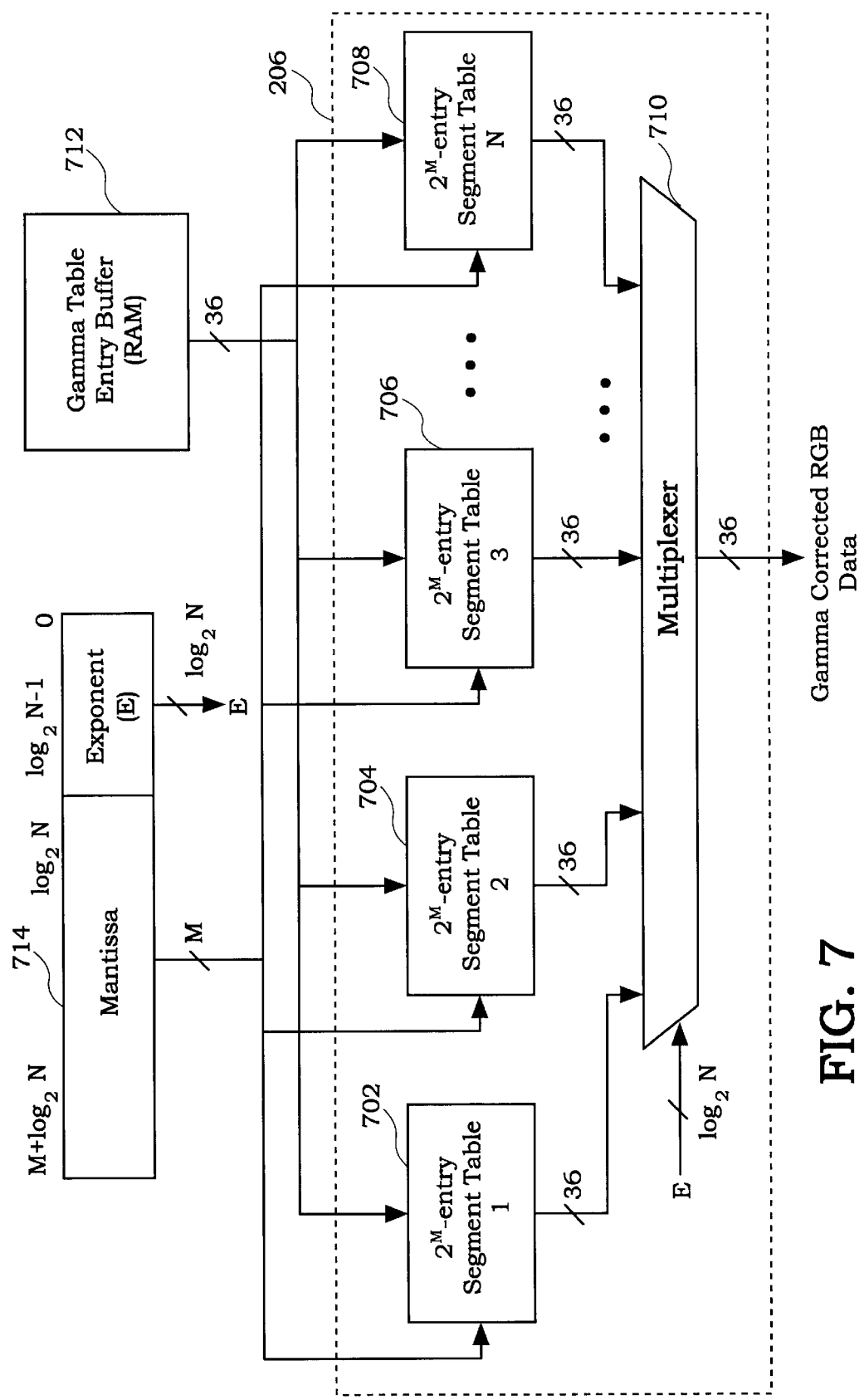
FIG. 7 illustrates a more detailed block diagram of a gamma correction device in accordance with one embodiment of the present invention.

FIG. 7 illustrates a more detailed block diagram of the gamma correction device 206, in accordance with one embodiment of the present invention. The gamma correction device uses a (M+$\log_2$N) bit datapath arranged in a floating point configuration, where M is the number of bits used as an index and N is the number of segment tables. Specifically, (M+$\log_2$N) bits 714 are used to transmit R, G, or B component data. Of these bits 714, M bits represent the mantissa and are used as an index (e.g., address) to a gamma correction table. On the other hand, $\log_2$N bits represent the number of bits in an exponent field, E, and are used to select a memory unit storing an associated gamma correction segment table. In this arrangement, N is preferably a number determined as power of 2, (i.e., $2^i$, where i is an integer ranging in a series from 0, 1, 2, 3, and so on).

In a preferred embodiment, the mantissa M is 10 bits wide while the exponent field E is 2 bits wide. This arrangement allows an effective 16-bit gamma correction with only a 12-bit floating point datapath. It should be appreciated, however, that the present invention may be utilized with any suitable number of bits for M and E to effect a datapath greater than the sum of the M and $\log_2$N bits.

The exponent may be an enumerant configured to reduce the number of required bits and need not be an integer. For example, exponent field E may be implemented as a 2-bit field to represent (e.g., encode) 3-bit values. For instance, enumerant values of 0, 1, 2, and 3, may be used to encode exponents 0, –2, –4, and –6, respectively. Given a total intensity value range between 0 and 1.0 in this example, the exponent values may be associated with a segment of intensity value range in binary format as shown in the following Table 2.

TABLE 2

| Exponent value | Associated Intensity Range (Binary) |
|---|---|
| 0 | 0.010000 to 1.0 |
| 1 | 0.0001000 to 0.00111111 |
| 2 | 0.000001000 to 0.00001111 |
| 3 | 0 to 0.0000001111 |

Using the floating point arrangement, the gamma correction device 206 receives the mantissa M and the exponent E, and selects a segment table and a gamma corrected intensity value. The gamma correction device includes N memory units 702, 704, 706, and 708 (e.g., storage units, SRAM, DRAM, SDRAM, etc.) for storing N gamma correction curve segment tables. Each of the memory units 702 through 708 is configured to receive and store up to $2^M$ intensity levels as entries.

An optional gamma table entry buffer 712 receives and stores gamma table entries for loading and updating gamma table entries in the memory units 702 through 708. In one embodiment, the gamma entry buffer 712 is configured to store up to 256 entries of 36 bits each for the RGB components. Alternatively, the gamma entry buffer 712 may store up to 256 entries of 12 bits each for use in determining R', G', and B' components individually. The memory units 702 through 708 are coupled to receive the entries from the buffer 712 for loading and updating the entries.

In one embodiment, each memory unit 702 through 708 is configured as $2^M \times 36$ bits to store gamma corrected R', G', and B' components simultaneously. In an alternative embodiment, the memory units 702 through 708 may be configured as $2^M \times 12$ bits to store gamma corrected intensity values for use in determining R', G', and B' components individually.

Each of the memory units 702 through 708, in a preferred embodiment, is coupled to receive the mantissa M as an index and output a gamma corrected value in response to the index. A multiplexer 710 is coupled to the memory units 702 through 708 to receive the selected entries from each of the memory units 702 through 708. The multiplexer 710 is also configured to receive the ($\log_2 N$)-bit exponent E to select one of the N memory units 702 through 708. For example, a 2-bit exponent allows selection of one of four memory units. In response to the exponent E, the multiplexer selects the entry from the selected memory unit and outputs the entry as the gamma corrected RGB data.

The present invention thus provides efficient gamma correction in all regions of a gamma correction curve by allowing partitioning of the gamma correction curve into a plurality of segments. Furthermore, by providing higher intensity resolutions in low luminance regions and lower resolutions in high luminance regions, the present invention enables banding effects to be substantially eliminated throughout the entire region of the gamma correction curve. In addition, the present invention uses an actual datapath of (M+$\log_2 N$) bits to provide a larger effective datapath by storing N segments of the gamma correction curve in N memory units with each memory unit storing up to $2^M$ entries. Accordingly, the method, device, and system of the present invention advantageously provide an efficient and economical gamma correction solution without the use of expensive and complex hardware and supporting circuitry.

Figure 8:
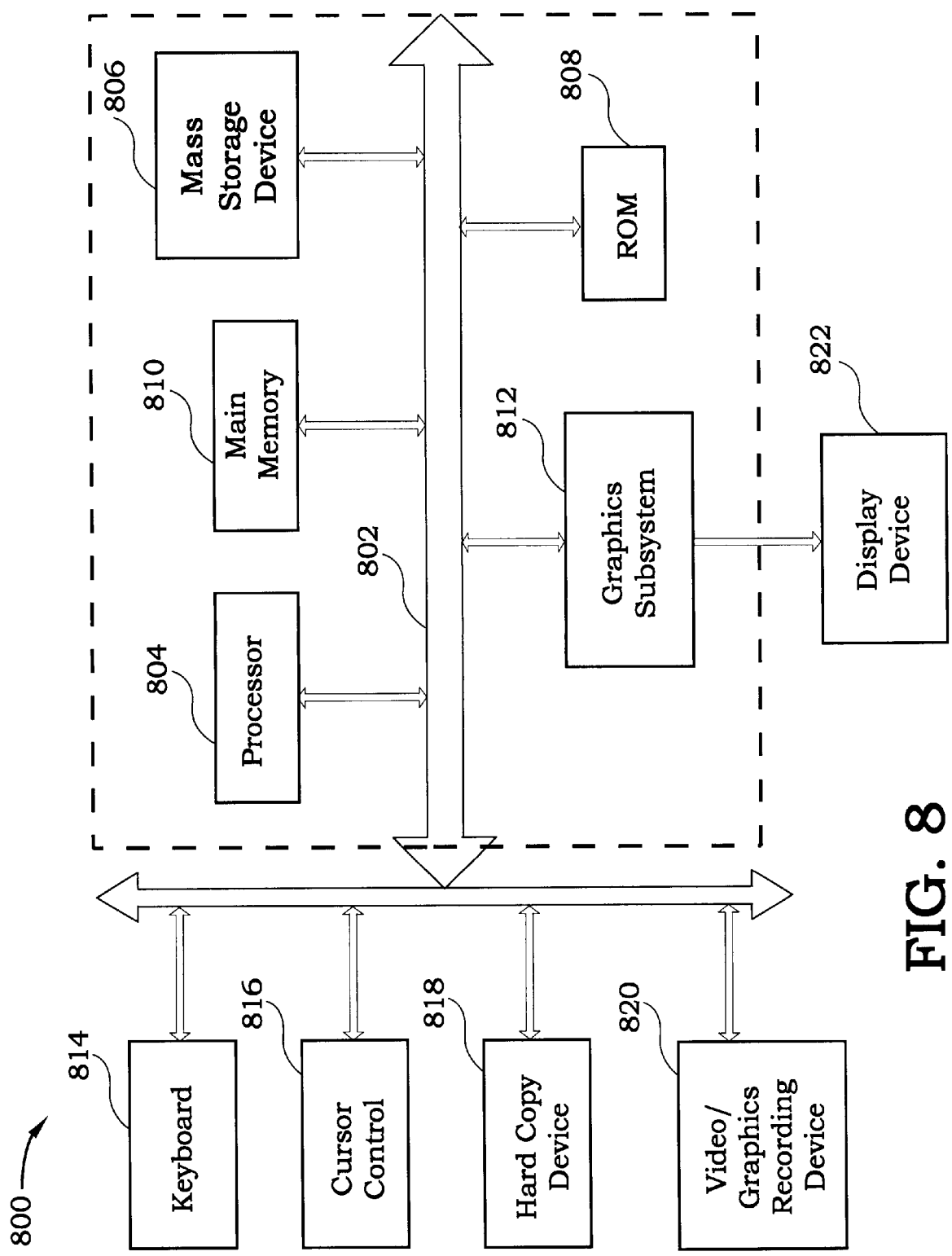
FIG. 8 illustrates a block diagram of a computer graphics system within which the present invention may be implemented or practiced.

FIG. 8 illustrates a block diagram of a computer graphics system 800 within which the present invention may be implemented or practiced. It should be appreciated that the computer graphics system 800 is exemplary only and that the present invention can operate within a number of different computer system configurations including general purpose computer systems, embedded computer systems, and computer systems specially adapted to electronic design automation. In describing various embodiments of the present invention, certain processes and operations are realized as a series of instructions (e.g., software programs) that reside within computer readable memory units of computer graphics system 800 and are executed by processors therein.

The computer graphics system 800 may be any computer-controlled graphics system suitable for generating complex or 3D images. The computer graphics system 800 includes a bus 802 for transmitting digital information between the various parts of the computer system. One or more processors 804 for processing information are coupled to the bus 802. The information, together with the instructions for processing the information, are stored in a hierarchical memory system comprised of a mass storage device 806, a read only memory (ROM) 808, and a main memory 810. The mass storage device 806 is used to store a vast amount of data and may include one or more hard disk drives, floppy disk drives, optical disk drives, tape drives, CD-ROM drives, or any number of other types of storage devices having media for storing data digitally. The ROM 808 is used to store digital data on a permanent basis, such as instructions for the microprocessors. The main memory 810 is used for storing digital data on an intermediate basis. The main memory 810 can be DRAM, SDRAM, RDRAM, or any other suitable memory for storing data while the computer graphics system 800 is turned on.

A graphics subsystem 812 may be included in the computer graphics system 800. The processor 804 provides the graphics subsystem 812 with graphics data, such as drawing commands, coordinate vertex data, and other data related to an object's geometric position, color, texture, shading, and other surface parameters. A display device 822 is coupled to the graphics subsystem to receive graphics data for display. Alternatively, the display device 822 may be coupled to the graphics system 800 via the bus 802.

Several other devices may also be coupled to the computer graphics system 800. For example, an alphanumeric keyboard 814 may be used for inputting commands and other information to processor 804 via the bus 802. Another type of user input device is cursor control device 816 (e.g., a mouse, trackball, joystick, and touchpad) used for positioning a movable cursor and selecting objects on a computer screen. Another device which may be coupled to bus 802 is a hard copy device 818 (e.g., laser printers, recording devices, and other printing devices) for printing or recording data or other information (e.g., gamma corrected intensity or pixel values) onto a tangible medium (e.g., film, paper, storage devices, etc.). Additionally, a sound recording or video recording device 820 may be coupled to the computer graphics system 800 to record, print, or provide multimedia capabilities.

Figure 9:
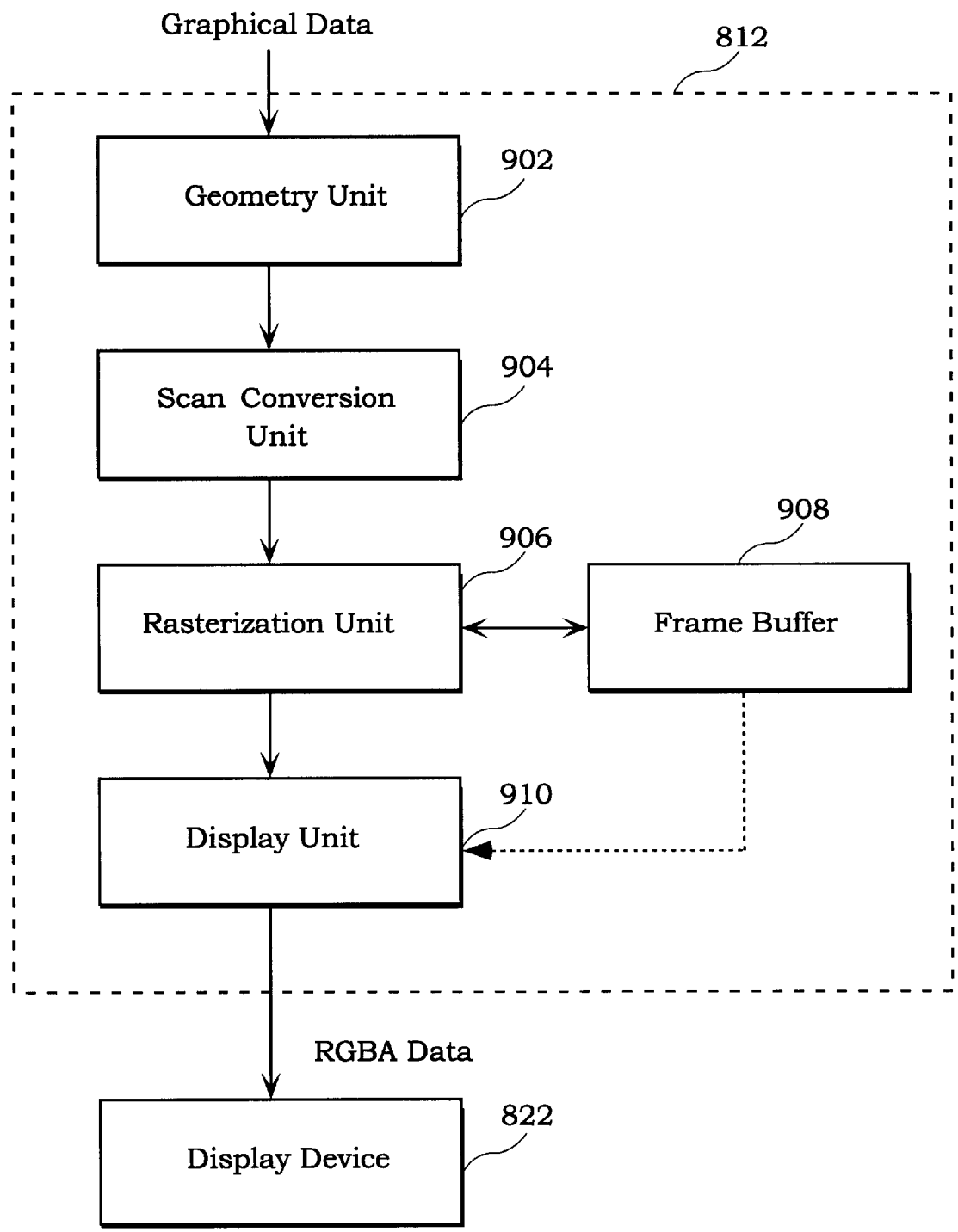
FIG. 9 illustrates a more detailed block diagram of the graphics subsystem.

FIG. 9 illustrates a more detailed block diagram of the graphics subsystem 812 in accordance with one embodiment of the present invention. The object data is processed by graphics subsystem 812 in the following pipelined stages: a geometry unit 902, a scan conversion unit 904, a rasterization unit 906, a frame buffer 908, and a display unit 910. The geometry unit 902 converts the graphical data from the processor 804 into a screen coordinate system and performs projection and transformation processes to give depth to a displayed object. The resulting primitives (points, lines, polygons, polyhedra, and the like) supplied by the geometry unit 902 are then provided to the scan conversion unit 904. The scan conversion unit 904 generates pixel data based on the received primitives by interpolating straight lines so that each intermediate value need not be individually and separately calculated by the geometry subsystem. The pixel data is then sent to the rasterization unit 906, where Z-buffering, blending, texturing, and antialiasing functions are performed. The resulting pixel values are subsequently stored in the frame buffer 908. The display unit 910 reads the frame buffer 908 directly or via the rasterization unit 906 and transmits the pixel values to the display device 822 for display.

Those skilled in the art will appreciate that the gamma correction display system 200 may be implemented in the computer graphics system 800. For example, the gamma correction device 206 may be implemented within the graphics subsystem 812 in any suitable manner. In such implementation, the gamma correction device 206 may be incorporated in either the rasterization unit 906 or the display unit 910 to process the graphics data from the frame buffer 908.

In summary, the present invention provides efficient gamma correction in all regions of a gamma correction curve by allowing partitioning of the gamma correction curve into a plurality of segments. The invention has been described herein in terms of several preferred embodiments. Other embodiments and equivalents of the invention will be apparent to those skilled in the art from consideration of the specification and practice of the invention. For example, any number of memory units may be employed to store N segments of the gamma correction curve table to implement a lookup table. The embodiments and preferred features described above should be considered exemplary, with the invention being defined by the appended claims.

What is claimed is:

1. In a display system, a method for performing gamma correction on a set of pixel data based on a gamma correction curve table having a specified total number of intensity levels associated with gamma corrected pixel values, one intensity level per pixel value, the method comprising:

partitioning the gamma correction curve table into N segments such that each of the N segments is associated with a set of intensity levels from the specified total number of intensity levels;

selecting a plurality of intensity levels for each of the N segments such that significant banding effects are not visible to the human eye between an adjacent pair of the selected intensity levels;

storing the gamma corrected pixel values for each of the N segments such that each of the plurality of selected intensity levels functions as an index to the associated gamma corrected pixel values; and performing gamma correction on the set of pixel data by accessing a stored pixel value in one of the N segments in response to the pixel data to generate gamma corrected pixel data.

2. The method as recited in claim 1, further comprising: outputting the gamma corrected pixel data to a display device for display.

3. The method as recited in claim 1, wherein the operation of performing gamma correction comprises:

selecting one of the N segments; and accessing the stored gamma corrected pixel data in the selected segment by using the set of pixel data as the index to the stored gamma corrected pixel data.

4. The method as recited in claim 1, wherein the set of pixel data includes R, G, and B components, each component including a ($\log_2 N$)-bit exponent and an M bit mantissa, wherein the exponent is used to select one of the N segments and the mantissa is used as the index to access the corresponding component of the gamma corrected pixel value.

5. The method as recited in claim 4, wherein each of the N segments includes up to $2^M$ intensity levels.

6. The method as recited in claim 4, wherein the gamma corrected pixel values include R', G', and B' components associated with each intensity level.

7. The method as recited in claim 1, wherein the difference in intensity between the adjacent intensity levels is less than or equal to about 1%.

8. The method as recited in claim 4, wherein M is 10 and N is 4 so as to implement an effective datapath of 16 bits.

9. The method as recited in claim 4, wherein the M bit mantissa and the N segments implement an effective datapath of greater than (M+$\log_2 N$) bits.

10. The method as recited in claim 4, wherein the display system includes a display device adapted to receive the gamma corrected pixel data.

11. The method as recited in claim 10, wherein the display system is included in a computer system.

12. The method as recited in claim 8, wherein the intensity levels range from 0 to 1.0, and wherein the exponent encodes values 0, 1, 2, and 3 with binary intensity value ranges of 0 to 0.0000001111, 0.000001000 to 0.00001111, 0.0001000 to 0.00111111, and 0.010000 to 1.0, respectively.

13. A gamma correction device for performing gamma correction on a set of pixel data based on a gamma correction curve table having a specified total number of intensity levels associated with gamma corrected pixel values, one intensity level per pixel value, the device comprising:

means for partitioning the gamma correction curve table into N segments such that each of the N segments is associated with a set of intensity levels from the specified total number of intensity levels;

means for selecting a plurality of intensity levels for each of the N segments such that significant banding effects are not visible to the human eye between an adjacent pair of the selected intensity levels;

means for storing the gamma corrected pixel values for each of the N segments such that each of the plurality of selected intensity levels functions as an index to the associated gamma corrected pixel values; and means for performing gamma correction on the set of pixel data by accessing a stored pixel value in one of the N segments in response to the pixel data to generate gamma corrected pixel data.

14. The device as recited in claim 13, further comprising: means for outputting the gamma corrected pixel data to a display device for display.

15. The device as recited in claim 13, wherein the means for performing gamma correction comprises:

means for selecting one of the N segments; and means for accessing the stored gamma corrected pixel data in the selected segment by using the set of pixel data as the index to the stored gamma corrected pixel data.

16. The device as recited in claim 13, wherein the set of pixel data includes R, G, and B components, each component including a ($\log_2 N$)-bit exponent and an M bit mantissa, wherein the exponent is used to select one of the N segments and the mantissa is used as the index to access the corresponding component of the gamma corrected pixel value.

17. The device as recited in claim 13, wherein the intensity difference between the adjacent intensity levels is less than or equal to about 1%.

18. The device as recited in claim 16, wherein M is 10 and N is 4 so as to implement an effective datapath of 16 bits.

19. A display system for performing gamma correction on a set of pixel data based on a gamma correction curve table having a specified total number of intensity levels associated with gamma corrected pixel values, one intensity level per pixel value, the system comprising:

a bus;

a processor coupled to the bus;

a main memory coupled to the bus;

a mass storage unit coupled to the bus;

a graphics unit coupled to the bus and including a gamma correction unit, the gamma correction unit including N storage units for storing the gamma corrected pixel values associated with selected intensity levels from N segments of the gamma correction curve table such that significant banding effects are not visible to the human eye between an adjacent pair of the selected intensity levels in each of the N segments, each of the selected intensity levels functioning as an index to the associated gamma corrected pixel values, wherein the set of pixel data is used as an index to access a stored gamma corrected pixel value in one of the N segments; and a display device coupled to receive and display the gamma corrected pixel value.

20. The system as recited in claim 19, wherein the graphics unit includes a gamma correction buffer coupled to the gamma correction unit for updating and loading the N storage units.

21. The system as recited in claim 19, wherein the set of pixel data includes R, G, and B components, each component including a ($\log_2 N$)-bit exponent and an M bit mantissa, wherein the exponent is used to select one of the N segments and the mantissa is used as the index to access the corresponding component of the gamma corrected pixel value.

22. The system as recited in claim 21, wherein each of the segments includes up to $2^M$ intensity levels.

23. The system as recited in claim 19, wherein the intensity difference between the adjacent intensity levels is less than or equal to about 1%.

24. The system as recited in claim 21, wherein M is 10 and N is 4 so as to implement an effective datapath of 16 bits.

25. The system as recited in claim 21, wherein the M bit mantissa and the N segments implements an effective datapath of greater than (M+$\log_2 N$) bits.

* * * * *